United States Patent [19]

Kanda et al.

[11] Patent Number: 4,480,625
[45] Date of Patent: Nov. 6, 1984

[54] INTERNAL COMBUSTION ENGINE WITH HELICAL INTAKE PORT AND COMBUSTION CHAMBER WITH TWO SQUISH AREAS

[75] Inventors: Mutsumi Kanda; Kiyoshi Nakanishi; Takeshi Okumura, all of Susono, Japan

[73] Assignee: Toyota Jidosha Kabushiki Kaisha, Toyota, Japan

[21] Appl. No.: 421,302

[22] Filed: Sep. 22, 1982

[30] Foreign Application Priority Data

Sep. 28, 1981 [JP] Japan .................. 56-154417

[51] Int. Cl.³ .................................. F02B 23/08
[52] U.S. Cl. .................... 123/661; 123/279; 123/188 M
[58] Field of Search .............. 123/657, 661, 193 H, 123/188 M, 193 P, 279

[56] References Cited

U.S. PATENT DOCUMENTS 3,945,363  3/1976  Elsbett et al. ............ 123/188 M
4,344,407  8/1982  Konishi et al. ............ 123/661
4,344,408  8/1982  Inoue et al. ............... 123/661

OTHER PUBLICATIONS

Geschelin; "Survey of Combustion Chamber Progress Part 1"; Automotive Industries; Nov. 1, 1962; pp. 42-45, 72 & 73.

Primary Examiner—Craig R. Feinberg
Attorney, Agent, or Firm—Edward W. Greason

[57] ABSTRACT

An internal combustion engine has a cylinder head formed with a wedge shaped cylinder head recess which has on its one side closer to a spark plug a steeply inclined roof surface of about 38° to 40° inclination and on its other side a gently inclined roof surface of about 5° to 20° inclination formed with an intake valve opening, and a piston formed with a piston recess which generally mates with the cylinder head recess and which has on its one side closer to the spark plug an inclined side surface of about 45° inclination. The planar surface portion of the piston crown and the planar surface portion of the cylinder head on opposite sides of the recessed portions mutually define a relatively large squish area on the side of the gently inclined roof surface and a relatively small squish area on the side of the steeply inclined roof surface. A helical port is connected to the intake valve opening so as to generate a swirl flow of air-fuel mixture in the combustion chamber.

6 Claims, 2 Drawing Figures

INTERNAL COMBUSTION ENGINE WITH HELICAL INTAKE PORT AND COMBUSTION CHAMBER WITH TWO SQUISH AREAS

BACKGROUND OF THE INVENTION

The present invention relates to an internal combustion engine, and more particularly relates to a spark ignition type internal combustion engine with a particular novel form of combustion chamber and intake port design.

In view of the insistent demands which are made these days upon automotive vehicles in the fields of fuel economy and purity of exhaust gases, there is a constant pressure for the development of internal combustion engines which provide advantages in these areas. Further, maintaining the drivability of the automotive vehicles incorporating such internal combustion engines is also very important. A number of means have been proposed for increasing the fuel efficiency of internal combustion engines while preserving an acceptable standard for the exhaust emissions thereof, and among these means the increasing of the compression ratio of the internal combustion engines figures largely.

However, the increasing of the compression ratio of an internal combustion engine is fraught with a number of problems, chief among which is the danger of detonation or so called "pinking". This detonation or pinking can be reduced and/or avoided by increasing the speed of transmission of flame in the compressed air-fuel mixture in the combustion chamber when the spark plug provides ignition therefor, and accordingly such an increase of the effective or apparent flame transmission speed in the combustion chamber is very helpful from the point of view of design ability to increase the compression ratio of the internal combustion engine, which increases the mechanical octane value of the engine and improves the fuel efficiency thereof. Furthermore, increase of the effective or apparent flame transmission speed in the combustion chamber is effective for stabilizing the combustion of the air-fuel mixture in said combustion chamber between one engine cycle and another, which improves the operation of the internal combustion engine during idling. This is effective for improving the drivability of the vehicle incorporating the internal combustion engine.

It is already known that increasing the amount of turbulence and the amount of microturbulence in the air-fuel mixture in the combustion chamber at the time of combustion thereof is very effective for increasing the effective or apparent flame transmission speed therein. However, it is an old but still a new task to obtain good design for an internal combustion engine, and in particular for a combustion chamber and intake system arangement therefor, which can provide a high degree of such turbulence and microturbulence in the air-fuel mixture in the combustion chambers of the engine, in order to obtain an internal combustion engine having high fuel economy and high purity of exhaust gases.

SUMMARY OF THE INVENTION

Accordingly, it is the primary object of the present invention to provide an internal combustion engine which has a high compression ratio, without causing the occurrence of detonation or pinking during the operation thereof.

It is a further object of the present invention to provide such an internal combustion engine which has a high mechanical octane value.

It is a further object of the present invention to provide such an internal combustion engine, in the operation of which good turbulence and microturbulence are produced in the air-fuel mixture in the combustion chambers of said internal combustion engine.

It is a further object of the present invention to provide such an internal combustion engine, in the operation of which flame travel of a high effective speed is produced in the air-fuel mixture in the combustion chambers of said internal combustion engine.

It is a further object of the present invention to provide such an internal combustion engine, in the operation of which the flame in the air-fuel mixture in the combustion chambers thereof is carried on substantial turbulence and microturbulence present in said air-fuel mixture, thus attaining a high effective flame travel speed.

It is a further object of the present invention to provide such an internal combustion engine, in the operation of which combustion efficiency is good.

It is a further object of the present invention to provide such an internal combustion engine, in the operation of which fluctuations in combustion effectiveness and efficiency between engine cycles are minimized.

It is a further object of the present invention to provide such an internal combustion engine, in the operation of which even combustion is attained.

It is a further object of the present invention to provide such an internal combustion engine, the combustion chambers of which include squish areas, in the operation of which the effective speed of travel of the flame front during combustion through these squish areas is good.

It is a yet further object of the present invention to provide such an internal combustion engine, by the operation of which good smoothness in operation for the automotive vehicle incorporating said internal combustion engine is attained.

It is a yet further object of the present invention to provide such an internal combustion engine, by the operation of which good idling operation for the automotive vehicle incorporating said internal combustion engine is attained.

It is a yet further object of the present invention to provide such an internal combustion engine, by the operation of which good fuel economy for the automotive vehicle incorporating said internal combustion engine is attained.

It is a yet further object of the present invention to provide such an internal combustion engine, by the operation of which good quality of exhaust gas emissions for the automotive vehicle incorporating said internal combustion engine is attained.

It is a yet further object of the present invention to provide such an internal combustion engine, by the operation of which good drivability for the automotive vehicle incorporating said internal combustion engine is attained.

According to the present invention, these and other objects are accomplished by an internal combustion engine, comprising: a cylinder block formed with a cylinder bore; a piston reciprocating in said cylinder bore between a lower position and a top dead center position and formed with a piston crown; said piston crown being formed with a piston crown recess and with the rest of its surface substantially planar and perpendicular to the central axis of said cylinder bore, said piston crown recess having an inclined side surface on one side thereof and a planar bottom surface; a cylinder head closing one end of said cylinder bore, a combustion chamber surface of said cylinder head lying proximate to said piston crown surface when said piston is at its said top dead center position; said combustion chamber surface of said cylinder head being formed with a wedge shaped cylinder head recess which has on its one side closer to said one side of said piston crown recess a steeply inclined roof surface and on its other side a gently inclined roof surface and with the rest of its surface substantially planar and perpendicular to the central axis of said cylinder bore; said gently inclined roof surface being formed with an intake opening and with an intake valve seat surrounding said intake opening, and said cylinder head being further formed with a helical type intake port opening to said intake opening; and a spark plug mounted in said steeply inclined roof surface of said wedge shaped cylinder head recess with its tip portion positioned close to a plane of said substantially planar surface of said cylinder head; wherein, when said piston is positioned at its said top dead center position, said planar surface of said piston crown and said planar surface of said combustion chamber surface of said cylinder head mutually define a relatively large squish area on the side of said gently inclined roof surface of said wedge shaped cylinder head recess and a relatively small squish area on the side of said steeply inclined roof surface of said wedge shaped cylinder head recess.

According to such a structure, when the intake air-fuel mixture is inhaled into the combustion chamber during the intake stroke of the piston, the helical type intake port imparts a swirling action to this air-fuel mixture, which results in substantial turbulence in the charge contained in the combustion chamber. A substantial part of this turbulence remains within this air-fuel mixture charge up to the time that the piston approaches its top dead center on its compression stroke. On the other hand, by the provision of the two squish areas defined on opposite sides of the combustion chamber as defined above, two opposed squish flows of air-fuel mixture are generated within the combustion chamber as the piston reaches its top dead center, and these squish flows rush out into the main or basic combustion chamber which is composed of the wedge shaped cylinder head recess and the piston crown recess, so as agitatingly to traverse the abovementioned flow of air-fuel mixture with turbulence, thereby breaking down the turbulence into microturbulence extended over the entire region of the combustion chamber. Because of the fact that the squish area on the side of said gently inclined roof surface of said wedge shape cylinder head recess and thus more remote from said spark plug is relatively large, as compared with the squish area on the side of said steeply inclined roof surface of said wedge shaped cylinder head recess and thus more proximate to said spark plug, these two squish flows collide with one another in the vicinity of the tip of said spark plug, thus causing particularly good turbulence and microturbulence in this area, and expediting initiation of the combustion of the air-fuel mixture. Because of the above features of the combustion chamber configuration and the intake system configuration of the internal combustion engine according to the present invention, the flame front propagates quickly and reliably within the combustion chamber. Thus the compression ratio of the internal combustion engine according to the present invention can be set to be at a higher value, without causing detonation or pinking, and this is, as explained above, very beneficial with regard to attaining the design objectives of modern internal combustion engines, especially with regard to fuel economy and quality of exhaust emissions. Further, because of the improved quality of the combustion of the air-fuel mixture, the variation of combustion efficiency and speed between one engine cycle and another is reduced, which implies smoother running of the internal combustion engine, and in particular better idling characteristics. This improves the drivability of an automotive vehicle incorporating said internal combustion engine.

Further, according to such a structure, because the bottom surface on the one side of the piston crown recess is gently inclined, much greater strength and heat resistance for this portion of the piston are attained, which is important for improving durability of the piston and thereby of the internal combustion engine according to the present invention as a whole.

Further, according to a particular aspect of the present invention, these and other objects are more particularly and concretely accomplished by such a construction as detailed above, wherein the angle between said inclined side surface of said piston crown recess and the planar bottom surface of said piston is approximately 135°; and/or the angle between said steeply inclined roof surface of said wedge shaped cylinder head recess and the planar surface of said cylinder head combustion chamber surface is approximately between 38° and 40°; and/or the angle between said gently inclined roof surface of said wedge shaped cylinder head recess and the planar surface of said cylinder head combustion chamber surface is approximately between 5° and 20°; and/or said piston crown recess is formed with a substantially vertical side surface on its side which is on the side of said gently inclined roof surface of said wedge shaped cylinder head recess, the angle between said substantially vertical side surface and said planar bottom surface being approximately between 70° and 90°.

According to such desirable values for the angles of the defining wall portions of the piston crown recess and the wedge shaped combustion chamber recess, the construction of the combustion chamber of the present invention may be best realized.

Further, according to a particular aspect of the present invention, these and other objects are more particularly and concretely accomplished by such an internal combustion engine as specified above, wherein the point of the boundary between said gently inclined roof surface of said wedge shaped cylinder head recess and said planar surface of said cylinder head combustion chamber which lies in a plane which contains the central axis of said cylinder bore and which also contains said tip portion of said spark plug and the point of the boundary between said substantially vertical side surface of said piston crown recess and said planar surface of said piston crown which lies in said plane are substantially directly opposed to one another in the direction along the axis of said cylinder bore; and/or wherein the point of the boundary between said steeply inclined roof surface of said wedge shaped cylinder head recess and said planar surface of said cylinder head combustion chamber which lies in a plane which contains the central axis of said cylinder bore and which also contains said tip portion of said spark plug and the point of the boundary between said inclined side surface of said piston crown recess and said planar surface of said piston crown which lies in said plane are substantially directly opposed to one another in the direction along the axis of said cylinder bore.

According to such structures, the effectiveness of each of the squish flows from each of these two squish areas is promoted, and there is no risk that these squish flows should be diverted by adhering to the planar surfaces of either the cylinder head or the piston crown.

Further, according to a particular aspect of the present invention, these and other objects are more particularly and concretely accomplished by such an internal combustion engine as described above, wherein the shapes of said piston crown and of said combustion chamber surface of said cylinder head exclusive of valve openings thereof are substantially symmetrical about said plane which contains the central axis of said cylinder bore and which also contains said tip portion of said spark plug.

According to such a structure, because of this symmetry in the combustion chamber construction, the two squish flows impinge together more exactly, and in particular are aided in their meeting in the region of the igniting tip of the spark plug.

Further, according to a particular aspect of the present invention, these and other objects are more particularly and concretely accomplished by such an internal combustion engine as described above, wherein the tip portion of said spark plug is positioned approximately at one fourth of the width of said cylinder head recess as measured in a plane which contains the central axis of said cylinder bore and which also contains the tip portion of said spark plug from the side closer to said spark plug, and wherein the ratio of the area of said relatively large squish area and that of said relatively small squish area is approximately four.

According to such a structure, as has been found by experiment and from theoretical considerations, the squish flows are again aided to impinge together more exactly in the region of the igniting tip of the spark plug.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
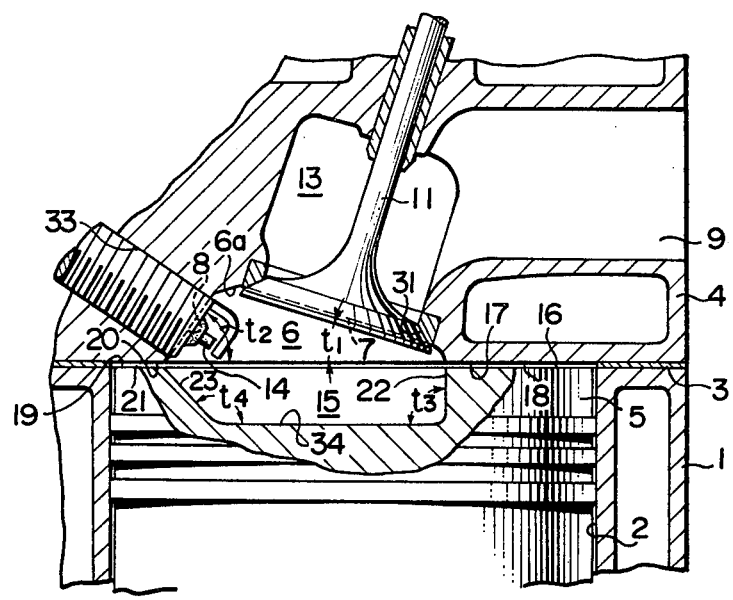
FIG. 1 is a vertical sectional view of a portion of the preferred embodiment of the combustion engine of the present invention which defines and includes one of the embodiment chambers thereof, taken generally along the plane I—I in FIG. 2.

The present invention will now be described with reference to a preferred embodiment thereof, and with reference to the appended drawings. In FIG. 1, which shows in cross section a part of an internal combustion engine which is the preferred embodiment of the combustion engine according to the present invention, the reference numeral 1 denotes a cylinder block, which is formed with a cylinder bore 2, the central axis of which lies in the plane of FIG. 1 and extends in the vertical direction therein. In fact, of course, this preferred embodiment of the internal combustion engine according to the present invention includes several such cylinder bores, and includes corresponding arrangements relating thereto as will shortly be described for this cylinder bore 2; but the construction relating to only the one cylinder bore 2 will be shown and described, since all the cylinders, combustion chambers, etc. of the internal combustion engine are all constructed in essentially the same fashion. The end of the cylinder bore 2 remote from the crankshaft (not shown) of the internal combustion engine according to the present invention is closed, with the interposition of a gasket 3 therebetween, by a cylinder head 4 only a portion of which is shown, and a piston 5 is slidingly received within the cylinder bore 2 and is coupled in a per se conventional manner to said crankshaft (not shown) by a connecting rod (also not shown) so as to reciprocate within said cylinder bore 2 up and down as seen in the figure according to a four stroke Otto cycle.

Figure 2:
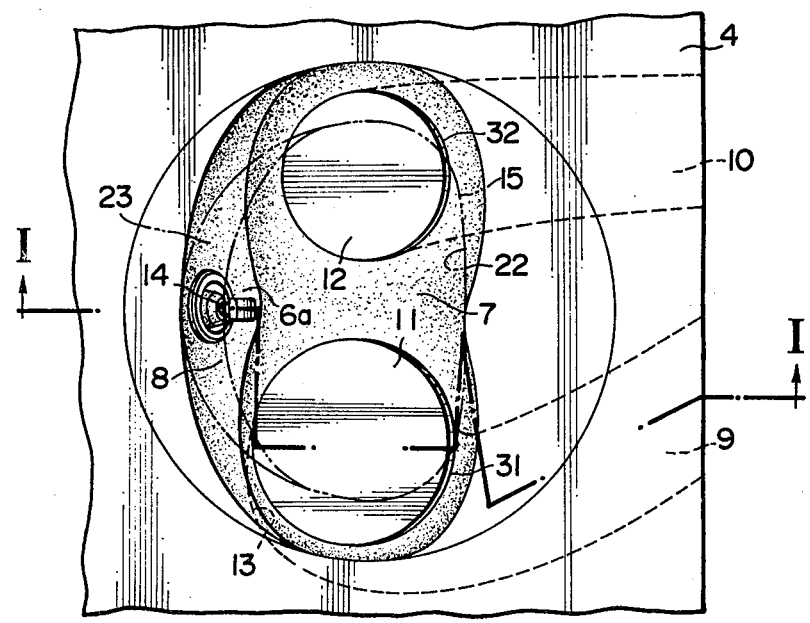
FIG. 2 is a view of the portion of the cylinder head of said preferred embodiment of the combustion engine of the present invention which closes said cylinder bore and defines said combustion chamber, as seen from the direction of said cylinder bore, also showing a spark plug which is associated with said combustion chamber and said intake valve and said exhaust valve likewise associated therewith, and also including views (delineated by phantom lines) of an air-fuel mixture intake port and of an exhaust port which are respectively controlled by said intake valve and said exhaust valve.

The lower surface as seen in the figure of the cylinder head 4, i.e. the surface thereof confronting the cylinder bore 2, is formed as a flat surface substantially extending in the plane of the opposing surface of the gasket 3, i.e. extending in a plane perpendicular to the central axis of the cylinder bore 2 and axially located at the top end in the figure of said cylinder bore 2, and in this flat surface of the cylinder head 4 there is formed a wedge shaped cylinder head recess 6. The view of the wedge shaped cylinder head recess 6 as seen along the axis of the cylinder bore 2 shown in FIG. 2 will make it clear that in plan view the wedge shaped cylinder head recess 6 is formed as a side-dented ellipse shape, and the section of the wedge shaped cylinder head recess 6 shown in FIG. 1, which is a symmetrical section which includes the minor axis of the ellipse shape shown in FIG. 2, shows that said wedge shaped cylinder head recess 6 is formed with a gently inclined roof surface 7 on its right hand side as seen in FIG. 1 and with a steeply inclined roof surface 8 on its left hand side as seen in that figure. Further, it is seen that the wedge shaped cylinder head recess 6 is offset with respect to the central axis of the cylinder bore 2, being displaced towards the left thereof as seen in the figures. The angle made by the gently inclined roof surface 7 with respect to the plane of the plane surface of the cylinder head 4, i.e. the plane perpendicular to the central axis of the cylinder bore 2, which is designated by the symbol "t1" in FIG. 1, may be between about 5° and about 20°; and the angle made by the steeply inclined roof surface 8 with respect to said plane of the plane surface of the cylinder head 4, which is designated by the symbol "t2" in FIG. 1, may be between about 38° and about 40°. The defining intermediate boundary between the gently inclined roof surface 7 and the steeply inclined roof surface 8 is designated in the figures by the reference symbol 6a, and its configuration can best be appreciated in the view of FIG. 2.

In the gently inclined roof surface 7 there are formed two valve seats, an intake valve seat 31 and an exhaust valve seat 32; and these valve seats cooperate respectively with a poppet type intake valve 11 and a poppet type exhaust valve 12. The view of FIG. 1 is taken in a plane perpendicular to the plane which contains the central axes of these two valves 11 and 12, so that only the intake valve 11 can be seen therein, the exhaust valve 12 being concealed behind said intake valve 11 in that view. To the seat 31 for the intake valve 11 there leads an intake port 9 formed in the cylinder head 4, and to the seat 32 for the exhaust valve 12 there leads an exhaust port 10 also formed in the cylinder head 4. Again only the intake port 9 can be seen in FIG. 1. Both the intake port 9 and the exhaust port 10 are shown in FIG. 2 by dashed lines; and as will be understood from this figure the intake port 9 is formed as a helical type intake port, including a helical channel shape 13 which, on the intake stroke of the shown cylinder, directs the intake air-fuel mixture past the open intake poppet type valve 11 into the wedge shaped cylinder head recess 6 with a screwing action, thus imparting turbulence thereto.

A spark plug 14 of a per se conventional sort is mounted in a screw hole 33 at substantially the central portion of the steeply inclined roof surface 8, and projects into the wedge shaped cylinder head recess 6 so that its tip is almost in the plane of the lower surface of the cylinder head 4, as may be seen in FIG. 1.

The upper surface 16 or the piston crown as seen in FIG. 1 of the piston 5, i.e. the surface thereof confronting the cylinder head 4, is formed as a flat surface substantially extending in the plane of the lower surface of the gasket 3 as seen in FIG. 1 when said piston 5 is at its top dead center, i.e. extending in a plane perpendicular to the central axis of the cylinder bore 2 and axially located at the top end in FIG. 1 of said cylinder bore 2, and in this flat upper crown surface of the piston 5 there is formed a piston crown recess 15.

The phantom view of the piston crown recess 15 as seen along the axis of the cylinder bore 2 shown in FIG. 2 by double dashed lines will make it clear that in plan view the piston crown recess 15 is formed as a side-flattened ellipse shape, and the section of the piston crown recess 15 shown in FIG. 1 shows that said piston crown recess 15 is formed with a flat bottom side surface 34 parallel to the upper crown surface 16, an inclined side surface 23 on its left hand side as seen in FIG. 1, and with a substantially vertical side surface 22 on its right hand side as seen in that figure. Further, it is seen that the piston crown recess 15 is offset with respect to the central axis of the cylinder bore 2, being displaced towards the left thereof as seen in the figures. The angle made by the substantially vertical side surface 22 with respect to the plane bottom surface 34 of the piston 5, which is designated by the symbol "t3" in FIG. 1, may be between about 70° and about 90° (in the shown construction it is substantially 90°), so as to provide a sharp edge suitable for generating a sharp squish flow, as described in detail hereunder; and the angle made by the bottom inclined side surface 23 with respect to the plane surface of the piston 5, which is designated by the symbol "t4" in FIG. 1, may be about 135°. In the sectional plane shown in FIG. 1, which contains the central axis of the spark plug 14 and also the central portions of the peripheries of the cylinder head recess 6 and the piston recess 15 which diametrically oppose the spark plug 14, the piston recess 15 matches to the cylinder head recess 6; i.e., in this section, the point at which the substantially vertical side surface 22 meets the flat surface 16 of the piston 5 is directly opposed in the direction along the axis of said cylinder bore 2 to the point at which the gently inclined roof surface 7 meets the flat surface 17 of the cylinder head 4, and similarly the point at which the inclined side surface 23 meets the flat surface 19 of the piston 5 is directly opposed in the direction along the axis of said cylinder bore 2 to the point at which the steeply inclined roof surface 8 meets the flat surface 20 of the cylinder head 4. These features of the shown construction aid in the production of the two squish flows from the two squish areas 18 and 21 which will shortly be described, and ensure that there is no risk that these squish flows should be diverted by adhering to the planar surfaces of either the cylinder head 4 or the crown of the piston 5. Further, it will be noted that the angle which the inclined side surface 23 makes with respect to the flat surface 19, i.e. an angle of the piston recess which corresponds to the angle t2 of the cylinder head recess, is about 45° and is compaable with the value of t2. The volumetric capacity of the piston crown recess 15 in the piston 5 may be approximately the same as that of the wedge shaped cylinder head recess 6 in the cylinder head 4.

Further, as will be understood from FIG. 2, in the shown preferred embodiment of the internal combustion engine according to the present invention, the shapes of said crown of said piston 5 and of said combustion chamber surface of said cylinder head 4 (of course exclusive of the valve seat openings in said cylinder head 4) are substantially symmetrical about the plane which contains the central axis of said cylinder bore 1 and which also contains said tip portion of said spark plug 14. Because of this symmetry in the construction of the combustion chamber, the two squish flows from the two squish areas 18 and 21 will impinge together more exactly, and in particular will be aided in their meeting together in the region of the igniting tip of the spark plug 14, as will also be better understood later.

In the figures, the flat part of the piston 5 on the side of the substantially vertical side surface 22 is designated by the reference numeral 16, and is relatively large; the flat part of the cylinder head on the side of the gently inclined roof surface 7 is designated by the reference numeral 17, and is also relatively large; the flat part of the piston 5 on the side of the inclined side surface 23 is designated by the reference numeral 19, and is relatively small; and the flat part of the cylinder head on the side of the steeply inclined roof surface 8 is designated by the reference numeral 20, and is also relatively small. Between the relatively large flat surface portion 16 of the piston 5 and the relatively large flat surface portion 17 of the cylinder head 4, there is defined a relatively large squish area, on the right in FIG. 1, which is designated by the reference numeral 18; and between the relatively small flat surface portion 19 of the piston 5 and the relatively small flat surface portion 20 of the cylinder head 4, there is defined a relatively small squish area, on the left in FIG. 1, which is designated by the reference numeral 21. It should be so arranged that, when the piston 5 is at its top dead center, the clearance of each of these squish areas 18 and 21 should be less than or equal to 1.25 mm, and this clearance can be of course adjusted by varying the thickness of the gasket 3. The ratio between the area of the squish area 18 and the area of the squish area 21 should be so selected that the ratio of the strengths of the squish flows generated thereby during operation of the internal combustion engine may be generally of the order of four to one, so that the impinging together of these squish flows should generally occur in the region of the igniting tip of the spark plug 14, which is, as shown in the embodiment shown in the figures, displaced toward the side of the steeply inclined roof surface 8 of the cylinder head recess 6 and the inclined side surface 23 of the piston crown recess 15 so that it is positioned approximately at one fourth of the width of the cylinder head recess 6 or the piston crown recess 15, in a plane which includes the central axis of the cylinder bore and which also includes the tip portion of the spark plug 14, from the side of the steeply inclined roof surface 8 or the inclined side surface 23.

Although the inclination of the inclined side surface 23 expressed by the angle t4 of the piston recess 15 is principally determined in relation to the inclination of the steeply inclined surface 8 of the cylinder head recess 6 from the point of view of obtaining good turbulence of the air-fuel mixture in the combustion chamber by the synergism of the helical intake port and the opposed squish areas, an additional advantage of the side surface of the piston recess 15 being formed with a gentle slope such as the inclined side surface 23 at the portion closest to the peripheral wall of the piston is to increase the resistance to thermal and mechanical deformation of the piston at that portion. This feature is thus effective for increasing the strength and resistance to wear, heat, and premature failure of the piston 5 as a whole.

The internal combustion engine described above operates as follows.

During the intake stroke of the piston 5, as it descends in the cylinder bore 2 and thus expands the space defined between it and the cylinder head 4, air-fuel mixture produced by a carburetor or a fuel injection nozzle not shown in the figure is sucked in through the intake port 9 past the open intake valve 11, between said intake valve 11 and the seat 31 from which the intake valve 11 is displaced, and enters the combustion chamber defined between the piston 5 and the cylinder head 4. During this intake process, this air-fuel mixture is given a swirling motion by the helical channel shape 13, so that it is imparted with substantial turbulence.

Next, during the compression stroke of the piston 5 as it rises within the cylinder bore 2 and thus shrinks the space defined between it and the cylinder head 4, the air-fuel mixture within this space is progressively compressed. During this compression stroke the swirling motion of the air-fuel mixture with turbulence is substantially maintained. As the piston 5 comes to top dead center, the gaps of the squish areas 18 and 21 become narrowed to effectively zero, i.e. the air-fuel mixture in these areas is more strongly compressed than the air-fuel mixture in the other parts of the combustion chamber and so called squish occurs in these areas, and as a result this air-fuel mixture in these areas is violently expelled generally in directions parallel to the plane of the drawing paper in FIG. 1 in so called squish flows which flow into the primary combustion chamber, defined by the wedge shaped cylinder head recess 6 and the piston crown recess 15. In fact, the two squish flows produced by the two squish areas 18 and 21 are directed in opposite directions so as to traverse the swirling flow of the air-fuel mixture compressed into the small space defined by the cylinder head recess 6 and the piston recess 15 and thereby to cause further turbulence, particularly microturbulence, in the swirling flow of the air-fuel mixture, and finally they impinge against one another. Since the squish flow from the squish area 18 remote from the spark plug 14 is substantially stronger than the squish flow from the squish area 21 proximate to the spark plug 14 so that these two squish flows will collide with one another in the region of the igniting tip portion of the spark plug 14, further turbulence and microturbulence are created around the igniting tip portion of the spark plug 14, in addition to good microturbulence generated in the entire volume of the primary combustion chamber. In this case, the inclined surfaces 8 and 23 of the cylinder head recess 6 and the piston recess 15 with substantially the same angle relative to the plane of the squish flows such as 38° to 45° operate to guide the collided flows of the squish flows therealong so that a pair of upper and lower turn around flows of air-fuel mixture are generated, toward the gently inclined surface 7 of the cylinder head recess 6 and the flat bottom surface 34 of the piston recess 15 respectively, thereby generating these swirl flows of air-fuel mixture in the combustion chamber, including the first swirl flow generated by the helical intake port and the second and third swirl flows generated by the abovementioned upper and lower turning around of the collided flows of the squish flows along the inclined surface of the cylinder head recess 6 and the inclined surface 23 of the piston recess 23, thereby further increasing agitation applied to the air-fuel mixture and further intensifying microturbulence all over the entire region of the combustion chamber. Thus, the flame produced by the sparking of this spark plug 14 rides on this abundant turbulence and microturbulence of the compressed air-fuel mixture, and therefore the apparent speed of transmission of the flame is increased and combustion is rapid and even and more close to complete.

Next, as the piston 5 descends within the cylinder bore 2 on its expansion stroke and thus expands the space defined between it and the cylinder head 4, the air-fuel mixture within this space is progressively decompressed and of course performs work on the piston 5. As the piston 5 descends from its top dead center, and especially as it reaches a position of 15° to 25° as measured in the crank angle diagram below its top dead center, and as the gaps of the squish areas 18 and 21 become opened up from being effectively zero, the air-fuel mixture in these squish areas is more strongly decompressed or sucked upon than is the air-fuel mixture in the other parts of the combustion chamber, and so called reverse or inverse squish occurs in these areas. As a result air-fuel mixture flows at high speed into these areas in so called inverse squish flows which flow from the primary combustion chamber, and this produces the result that the flame front is propagated extremely quickly through these squish areas, causing combustion therein. In this way the total combustion time period is made extremely short in duration.

Thus, by improving the speed of combustion in the combustion chamber as a whole, and by improving its evenness, it will be understood that the compression ratio of the internal combustion engine according to the present invention can be raised, without the undesirable occurrence of knocking or pinking therein. This raising of the compression ratio, as mentioned above, and the accompanying increase of the mechanical octane number of the internal combustion engine, can be effective for improving the fuel efficiency of a vehicle incorporating this internal combustion engine, as well as for improving the quality of the exhaust emissions thereof. Further, because the variation in the combustion efficiency and speed between one engine cycle and the next is reduced, according to the present invention, therefore the fluctuation of engine speed is reduced, as compared to the prior art; and this improves the drivability of the vehicle incorporating this internal combustion engine, as well as in particular giving the engine better idling characteristics.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. An internal combustion engine, comprising:
   a cylinder block formed with a cylinder bore;
   a piston reciprocating in said cylinder bore between a lower position and a top dead center position and formed with a piston crown; said piston crown being formed with a piston crown recess and with the rest of its surface substantially planar and perpendicular to the central axis of said cylinder bore, said piston crown recess having an inclined side surface on one side thereof, a side surface on an opposite side thereof having a generatrix which is substantially parallel to the central axis of said cylinder, and a planar bottom surface which is substantially parallel to said rest of the piston crown surface;
   a cylinder head closing one end of said cylinder bore, a combustion chamber surface of said cylinder head lying proximate to said piston crown surface when said piston is at its said top dead center position; said combustion chamber surface of said cylinder head being formed with a wedge shaped cylinder head recess which has on its one side closer to said one side of said piston crown recess a steeply inclined roof surface and on its other side a gently inclined roof surface and with the rest of its surface substantially planar and perpendicular to the central axis of said cylinder bore; said gently inclined roof surface being formed with an intake opening, and said cylinder head being further formed with a helical type intake port opening to said intake opening; and
   a spark plug mounted in said steeply inclined roof surface of said wedge shaped cylinder head recess with its tip portion positioned close to a plane of said substantially planar surface of said cylinder head;
   wherein, when said piston is positioned at its said top dead center position, said planar surface of said piston crown and said planar surface of said combustion chamber surface of said cylinder head mutually define a relatively large squish area on the side of said gently inclined roof surface of said wedge shaped cylinder head recess with edge portions of said two planar surfaces located opposite said spark plug and substantially coinciding with each other and a relatively small squish area on the side of said steeply inclined roof surface of said wedge shaped cylinder head recess with edge portions of said two planar portions located close to said spark plug and substantially coinciding with each other.

2. An internal combustion engine according to claim 1, wherein the angle between said inclined side surface of said piston crown recess and the planar bottom surface of said piston is approximately 135°.

3. An internal combustion engine according to claim 1, wherein the angle between said steeply inclined roof surface of said wedge shaped cylinder head recess and the planar surface of said cylinder head combustion chamber surface is approximately between 38° and 40°.

4. An internal combustion engine according to claim 1, wherein the angle between said gently inclined roof surface of said wedge shaped cylinder head recess and the planar surface of said cylinder head combustion chamber surface is approximately between 5° and 20°.

5. An internal combustion engine according to claim 1, wherein the shapes of said piston crown and of said combustion chamber surface of said cylinder head exclusive of valve openings thereof are substantially symmetrical about said plane which contains the central axis of said cylinder bore and which also contains said tip portion of said spark plug.

6. An internal combustion engine according to claim 1, wherein the tip portion of said spark plug is positioned approximately at one fourth of the width of said cylinder head recess as measured in a plane which contains the central axis of said cylinder bore and which also contains the tip portion of said spark plug from the side closer to said spark plug, and wherein a ratio of the area of said relatively large squish area and that of said relatively small squish area is approximately four.

* * * * *